(12) United States Patent
Schäffel et al.

(10) Patent No.: US 9,479,040 B2
(45) Date of Patent: Oct. 25, 2016

(54) HIGH-RESOLUTION POSITIONING DEVICE

(75) Inventors: Christoph Schäffel, Ilmenau (DE);
Michael Katzschmann, Ilmenau (DE);
Hans-Ulrich Mohr, Großbreitenbach (DE); Carolin Walenda, Karlsruhe (DE); Rainer Glöß, Waldbronn (DE);
Christian Rudolf, Karlsbad (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 378 days.

(21) Appl. No.: 14/112,315

(22) PCT Filed: Apr. 27, 2012

(86) PCT No.: PCT/EP2012/057752
§ 371 (c)(1),
(2), (4) Date: Nov. 19, 2013

(87) PCT Pub. No.: WO2012/146709
PCT Pub. Date: Nov. 1, 2012

(65) Prior Publication Data
US 2014/0077627 A1    Mar. 20, 2014

(30) Foreign Application Priority Data
Apr. 29, 2011  (DE) .................. 10 2011 100 153

(51) Int. Cl.
*H02K 41/02* (2006.01)
*H02K 7/09* (2006.01)
(Continued)

(52) U.S. Cl.
CPC ............. *H02K 41/02* (2013.01); *H02K 7/09* (2013.01); *H02K 41/031* (2013.01); *H02K 2201/18* (2013.01)

(58) Field of Classification Search
CPC ...... H02K 41/02; H02K 41/031; H02K 7/09; H02K 2201/18

USPC ........... 310/12.06, 12.05, 12.19, 68 B, 68 E, 310/90.5; 250/442
See application file for complete search history.

(56) References Cited

U.S. PATENT DOCUMENTS 4,857,781 A    8/1989   Shih ........................ 310/12.08
5,925,956 A *  7/1999   Ohzeki .................. F16C 29/00
                                                310/12.06
(Continued)

FOREIGN PATENT DOCUMENTS

DE    3037648    4/1981    ............. H02K 37/00
DE    19511973   12/1996   ........... H02K 41/035
(Continued)

OTHER PUBLICATIONS

English translation for DE 10054376; Germany; Jun. 2001.*
(Continued)

*Primary Examiner* — Terrance Kenerly
*Assistant Examiner* — Ahmed Elnakib
(74) *Attorney, Agent, or Firm* — Gerald T. Bodner (57) ABSTRACT

A high-resolution positioning device has a stator and a rotor, a coil array, arranged on the stator, and having at least three groups of flat coils, wherein each group has at least two single coils and the coil array encloses a free space on the stator, also having permanent magnetically-excited circuits that are situated on, against or in the rotor and form a magnet array which likewise encloses a free space, wherein the free spaces accommodate a position measuring system which has a measuring head having sensors, and an area scale. The device is in the form of a freely suspended, magnetically controlled six-dimensional drive, wherein the measuring head is situated in the coil array free space and the area scale is situated in the magnet array free space, and the rotor is free of drive-related electrical or electronic and, in this regard, live parts.

22 Claims, 9 Drawing Sheets

(51) Int. Cl.
*H02K 11/00* (2016.01)
*H02K 41/03* (2006.01)

(56) References Cited

U.S. PATENT DOCUMENTS

| | | | | |
|---|---|---|---|---|
| 6,097,114 A * | 8/2000 | Hazelton | ............ | G03F 7/70758 310/12.06 |
| 6,441,514 B1 * | 8/2002 | Markle | ............... | G03F 7/70758 310/12.06 |
| 6,445,093 B1 * | 9/2002 | Binnard | ............. | G03F 7/70716 250/491.1 |
| 6,452,292 B1 * | 9/2002 | Binnard | ............. | G03F 7/70716 310/12.06 |
| 6,495,934 B1 * | 12/2002 | Hayashi | ............. | G03F 7/70758 29/596 |
| 6,639,225 B2 * | 10/2003 | Kirschstein | ............. | G03F 7/707 250/398 |
| 2002/0079888 A1 * | 6/2002 | Frissen | ................ | H02K 41/031 324/207.2 |
| 2004/0239911 A1 * | 12/2004 | Carter | ................ | G03F 7/70066 355/75 |
| 2009/0086177 A1 * | 4/2009 | Vosters | ............... | G03F 7/70716 355/53 |
| 2014/0285122 A1 * | 9/2014 | Lu | ........................ | H02K 21/24 318/135 |

FOREIGN PATENT DOCUMENTS

| | | | | |
|---|---|---|---|---|
| DE | 10054376 | | 6/2001 | ............ H02K 41/02 |
| EP | 1189018 | | 3/2002 | ............ G01B 11/27 |
| EP | 1243972 | * | 3/2002 | |
| EP | 1243972 | | 9/2002 | ............... G03K 7/20 |
| WO | WO 00/10242 | | 2/2000 | ............ H02K 41/00 |

OTHER PUBLICATIONS

English translation for JP 2000092815; Japan; Mar. 2000.*
International Preliminary Report on Patentability (Chapter I of the Patent Cooperation Treaty), in English, dated Oct. 29, 2013, Written Opinion of the International Searching Authority, in English (Oct. 29, 2013—mailed with the International Preliminary Report on Patentability), and International Search Report, in English, dated Apr. 12, 2013, each of which was issued by the International Bureau of WIPO for corresponding PCT Application No. PCT/EP2012/057752, filed on Apr. 27, 2012.

* cited by examiner

HIGH-RESOLUTION POSITIONING DEVICE

The invention relates to a high-resolution positioning device having a stator and a rotor, a coil array, arranged on the stator, having at least three groups of flat coils, wherein each group has at least two single coils and the coil array encloses a free space on the stator, also having permanent magnetically-excited circuits that are situated on, against or in the rotor and form a magnet array which likewise encloses a free space, wherein the free spaces hold a position measuring system which has a measuring head having sensors, and has an area scale, according to claim 1.

A two-coordinate stepper motor is known from DE 30 37 648 A1, in which coils or permanent magnets are disposed in a movable part which is supported in a plane inter alia by magnetic suspension. Moreover, plates, interferometer mirrors and further incremental transmitter plates are provided perpendicular to each other for incremental signal recovery and position control. In each movement coordinate of the two-coordinate stepper motor, at least two oppositely polarized permanent magnets are arranged on a ferromagnetic base plate, and a ferromagnetic return path part is in each case arranged above the oppositely polarized permanent magnets. At least one rectangular coil having coil heads protruding largely over the magnetic pole width is situated in the air gap between the permanent magnets and the magnetic return path part. The coil heads are situated in a part formed as a table plate with the force-effective coil strings facing the table center. Apart from the coil strings facing the table center, recesses of at least the size of the travel and cross-section of the magnetic return path part are provided in the table plate, and an object carrier of a radiation-permeable material, e.g. glass, is provided in the table center. In one embodiment, at least three rectangular coils are disposed with their associated pairs of permanent magnets at an angle of preferably 120° with the non-force-effective coil heads facing the table center. With the previously known two-coordinate stepper motor, minute step widths of to below 1 μm are intended to be achieved and a favorable dynamic behavior granted.

In the positioning system for a lithographic apparatus according to EP 1 243 972 A1, a planar motor is employed which has a stator as well as a rotor. The stator comprises an arrangement of a plurality of segment magnets having periodic polarization, wherein same interact with energizable coils in order to cause the desired positioning movement. The solution therein is furthermore characterized by a coarse positioning module which interacts with a fine positioning module in order to be able to quickly cover longer travels on the one hand, and achieve the desired positioning accuracies on the other.

DE 100 54 376 A1, which establishes a generic group, shows an electrodynamic planar x-y-Φ direct drive in flat design which exhibits low normal force and tangential force fluctuations. A control system therein is inter alia able to identify both the size and position of a load mass. The drive according to DE 100 54 376 A1 is one in which the stator and rotor are air bearing-positioned with respect to each other. Paired opposite coils are applied and fixed to the stator. The rotor is composed of a rotor frame, in the center of which a measuring system arrangement is provided. The rotor frame has an air bearing attachment at each of its corners, which in each case receives an air bearing nozzle, and possesses frame stays between the air bearing attachments, which in turn each include frame receptions in which a permanent magnetically-excited circuit is received. The permanent magnetically-excited circuits each comprise two single magnets which are bridged by means of a return path yoke. At its underside, the rotor possesses in its center a recess for receiving a dimensional measure which is e.g. formed by an area scale. A scanning unit is situated immediately below the dimensional measure in the center of the stator, the scanning grid plate of which scans the dimensional measure at the given distance. Each of the sensor fields of sensor modules comprised of transmitters and receivers, which allow an irradiation by the scanning grid to the dimensional measure and back through the scanning grid to the receiver, detects the light radiation modulated with a relative movement between the dimensional measure and the scanning grid and converts same into electric signals. The provided optical scanning allows movements in the x-y direction and also torsional movements to be determined. The detection of tilted movements and/or movements in a vertical, i.e. z direction, is not possible.

Prior art reference should further be made to DE 195 11 973 A1 which shows a planar direct drive constructed from basic drive elements which are composed of two oppositely polarized magnets that form a short magnetic circuit via ferromagnetic yokes and a ferromagnetic stator. Furthermore, flat coils on the stator are in each case allocated to the magnetic circuit, wherein magnets and yokes in the rotor are moved in common. The stator of the previously known arrangement carries symmetrically opposite pairs of flat coils which are commutated according to the rotor's position. A counterphase energization of respective opposite coils allows a drive torque to be generated with respect to the rotor's center of gravity. The direct drive therein is also equipped with a measuring system.

From the aforementioned, the task of the invention is to propose a further developed high-resolution positioning device having a stator and a rotor which enables positioning in six degrees of freedom. The rotor which constitutes a movable platform should be free of electrical wiring. The positioning accuracy and thus the movement resolution should be in the lower nanometer range and preferably <20 nm.

The solution of the inventive task yields from a positioning device according to the feature combination of claim 1, with the dependent claims comprising at least appropriate configurations and improvements.

The invention accordingly assumes a purely magnetically guided and driven movement system, in which the rotor movement occurs on the basis of magnetic field forces without any mechanical contact between the stator and rotor. The measuring system employed according to the invention detects all movement degrees of freedom translationally in the x, y and z directions, as well as rotationally about the x, y and z axes. The measuring system is thus capable of detecting the vertical rotor position and the tilted rotor position. The inventive configuration creates a flat reference area of at least the size of the flat travel range of the rotor. The reference area or the area scale or the dimensional measure is arranged close to the object to be moved or measured for minimizing measuring errors.

The proposed positioning device has a coil array, arranged on the stator, having at least three groups of flat coils, wherein each group has at least two single coils. The coil array encloses a free space on the stator or on the stator surface. Furthermore, permanent magnetically-excited circuits are situated on, against or in the rotor and form a magnet array. This magnet array likewise encloses a free space. The free spaces mentioned above accommodate the position measuring system which has a measuring head with sensors and an area scale. The free spaces are selected such that an area is provided which essentially corresponds to the size of the flat travel area.

In accordance with the invention, the positioning device is formed as a freely suspended, purely magnetically controlled six-dimensional drive, wherein the measuring head is situated in the coil array free space and the area scale in the magnet array free space. The rotor itself is free of drive-related or sensor-related electrical or electronic and, in this regard, live parts.

In a preferred configuration, the measuring head has an area shape adapted to the coil array free space and utilizing the available space.

The measuring head moreover comprises optical incremental sensors as well as capacitive sensors.

In a preferred embodiment, the capacitive sensors are arranged in the area edge region of the measuring head, and at least one optical sensor is further arranged in the center of the measuring head. By means of the capacitive sensors, a movement in the z direction can be detected at a resolution of about 1 nm. Tilting angles and movements related thereto can likewise be detected.

The optical incremental sensors detect the horizontal movements in the x and y directions as well as torsional or rotational movements of the rotor about z.

The capacitive sensors are each composed of a pair of sensors which detect the respective distance from the surface of the area scale in order to detect angular positions u, v and movements in the z direction therefrom.

In a preferred configuration, the measuring head has the shape of a triangle. The capacitive sensors formed in pairs in this preferred embodiment are situated in the corner areas of the triangle. The optical sensors are preferably disposed in the center of the triangular measuring head. The above measures ensure the high dynamics required pursuant to the task and the desired resolution in all degrees of freedom.

The respective coil groups are realized as a component of the coil array in the form of a structural unit having cooling tubes and forming a sandwich arrangement.

The permanent magnetically-excited circuits are each composed of a Halbach array comprising a plurality of segments.

By Halbach array, a special configuration of permanent magnets is understood which enables the magnetic flux on one side of the configuration to be almost completely canceled but amplified on the other side. In this respect, a Halbach array is composed of segments of permanent magnets, the magnetization direction of which is tilted relative each other by 90° in the direction of the longitudinal axis of the array. Hereby, the field lines move closer together on that side towards which the field director is tilted. This causes the magnetic flux density to increase. On the opposite side, the field lines are less close than in the undisturbed magnet. The field is thereby weakened or cancelled after just a short distance, since north and south poles alternate in each case. A Halbach array allows the length of magnetic material to be reduced in relation to the desired force effects. This in turn results in a desired reduction of the mass of the rotor in which the magnets are integrated or accommodated.

The respective coil group may in a further configuration comprise an enclosure with means for supplying or discharging a cooling medium. Cooling of the coil groups is also possible by means of a heat pipe. By the compact arrangement of cooling tube and coil, undesired temperature gradients across the area extension of the coil array or the respective coil pairs are effectively prevented.

For receiving the magnet array, the rotor is configured as a supporting body having hollow spaces in one configuration of the invention.

For weight compensating the rotor, electromagnetic and/or permanent magnetic means may be provided. There is the option in one configuration of coupling ferromagnetic plates covering the rotor and travel range to the stator, and permanent magnetically-excited magnet circuits to the rotor, and providing an air gap distance between the ferromagnetic plates and the permanent magnetically-excited magnet circuits, wherein the ferromagnetic plates cover the pole faces of the permanent magnetically-excited magnet circuits preferably completely in each position of the rotor.

In one implementation, ferromagnetic plates covering the rotor and travel range may be coupled to the stator and electromagnets formed to interact with the ferromagnetic plates, wherein an air gap distance is present between the ferromagnetic plates and the electromagnets, and the ferromagnetic plates cover the pole faces of the electromagnets preferably completely in each position of the rotor.

Reference sensors are provided for a defined start or rest position for the rotor relative to the stator in a position provided for the purpose.

The coil array is preferably embedded in the stator and is essentially flush with the stator surface. As the stator material, natural or synthetic stone, in particular a granite block, is employed, for example.

The invention shall be explained in more detail below on the basis of an exemplary embodiment and with the aid of figures.

Shown are in.

The positioning device according to the invention and exemplary embodiment is based on a planar coil array which is preferably arranged on and attached to a stator plate. The coil array is composed, for instance, of six flat coils which are arranged in three pairs symmetrically offset in a star-shape.

A free space is situated in the center of the arrangement which is used for arranging a measuring head for detecting six degrees of freedom, said measuring head in turn being positioned on the stator plate in a defined manner or being able to be positioned there in a manner to be calibrated.

At least one magnet array is part of the coil array and is composed of at least three rows of alternately polarized magnets which are each arranged centered to a coil pair of the coil array when the rotor is in the center position.

Figure 2:
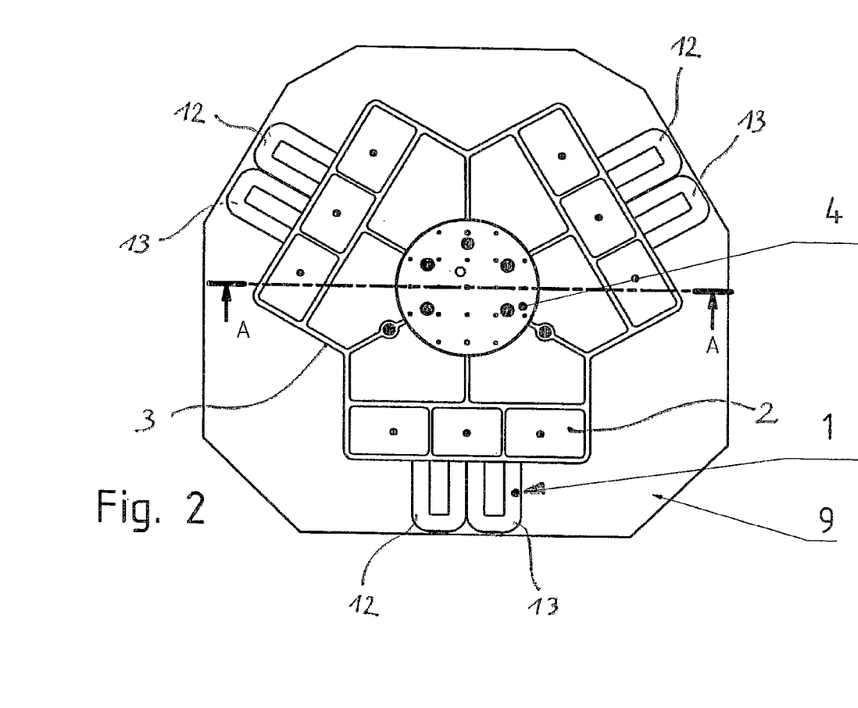
FIG. 2 a top view of the inventive arrangement with an identifiable stator, coil array as well as rotor and magnets provided in same.

The magnet rows, as can be identified in FIG. 2, for instance, are realized in the form of a triangular arrangement, at the center of which a further free space is situated.

This free space is preferably utilized to arrange a 6D area scale for the areal dimensional measure representation for the 6D measuring system.

With a corresponding energization and commutation of one coil pair of the coil array of the arrangement, horizontal and vertical forces as well as torques can be imposed on the rotor by the magnetic interaction in the associated row of the magnet array.

Figure 3A:
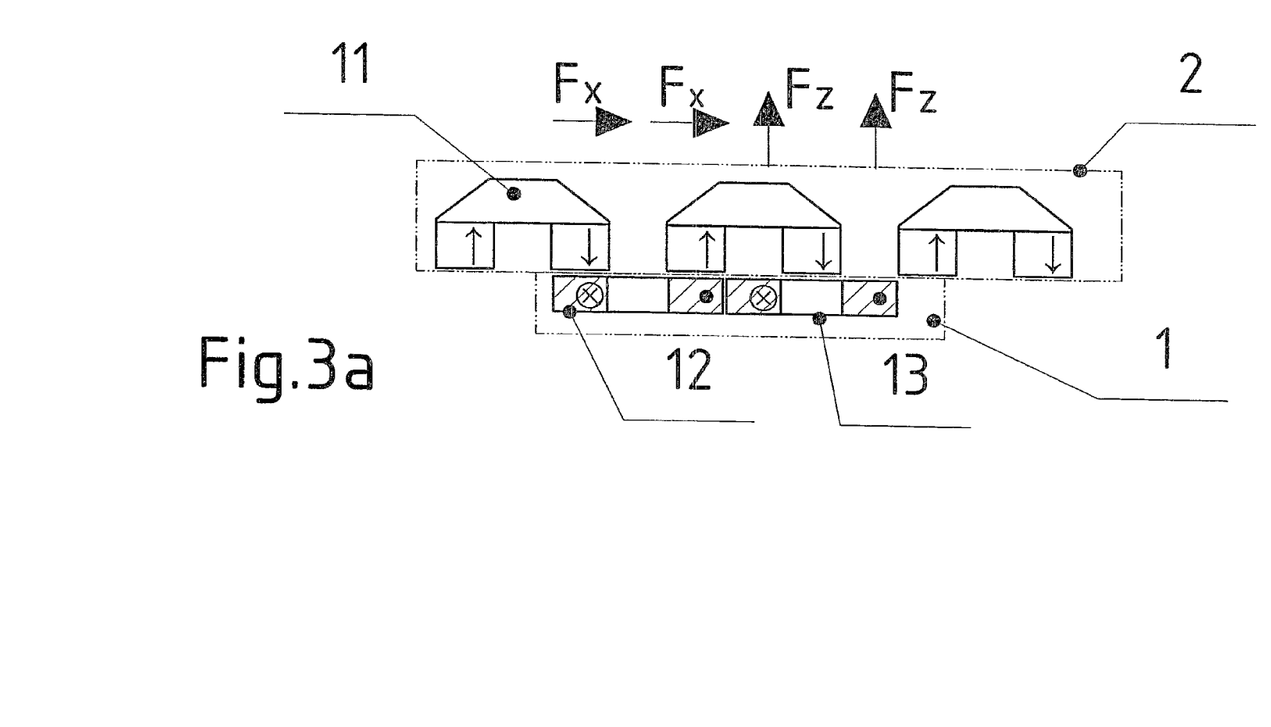
FIG. 3a an arrangement of magnet bridges composed of magnet elements and yokes as well as coils situated underneath with outlined energization directions as well as force vectors and polarities.
Figure 3B:
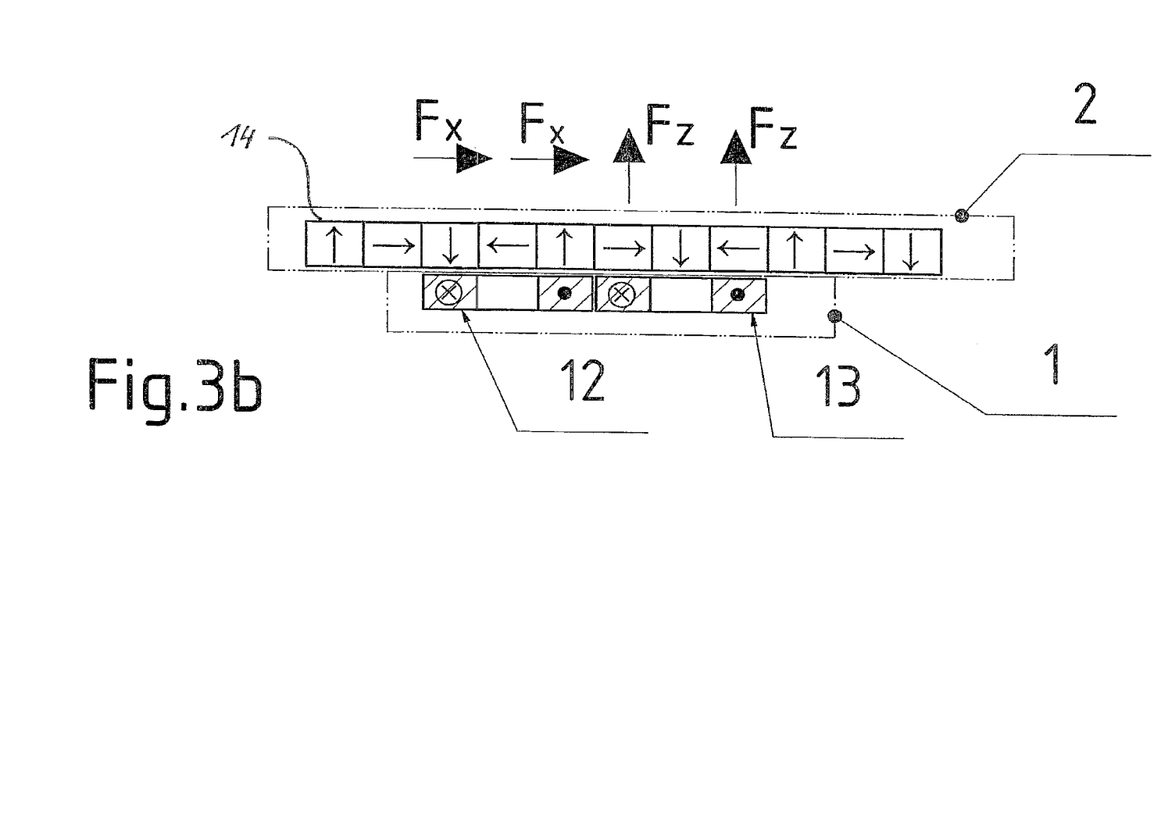
FIG. 3b a representation of a permanent magnetic circuit in the form of a Halbach array and associated, correspondingly positioned coils with corresponding energization directions, force vectors and polarities.

The force vectors are illustrated as per FIGS. 3a and 3b as arrows above the magnet bridges and the Halbach array respectively.

The vertical components $F_z$ of the forces serve the purpose of the rotor weight and of vertical positioning. The horizontal force components $F_x$ and $F_y$ (not shown) serve the purpose of horizontal accelerating and positioning.

When the control, which is not shown in the figures, is taken out of service, the rotor can be placed to rest on slide feet. When the control is put into service, the slide feet likewise serve to allow the rotor to slide on the stator while scanning given reference marks of the 6D measuring system.

After the scanning of the reference marks, the 6D control is put into operation. For the carrying and defined highly precise 6D positioning of the rotor in space, the inventive solution advantageously requires only six actuator elements which are aggregated as a combination of the coil array and magnet array.

Figure 1:
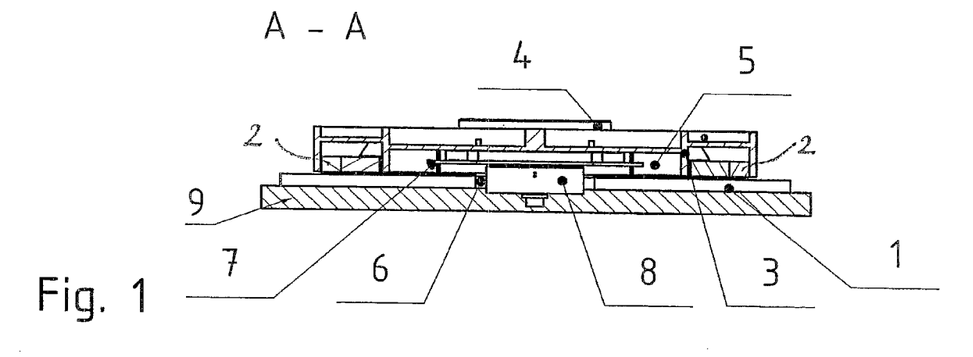
FIG. 1 a sectional representation of the inventive positioning device taken along line A-A as per FIG. 2.

The sectional representation along line A-A as per FIG. 2 shows a principle representation of the high-resolution positioning device. The coil array 1 here is arranged on and attached to a stator 9. The coil array 1 is composed of six flat coils which are arranged in three pairs each offset by 120° in a star shape (see FIG. 2). Each coil pair of the coil array 1 comprises a first coil 12 and a second coil 13. The coils 12 and 13 can be embedded in a corresponding recess of the stator and be flush with the surface thereof.

A free space 6, also designated as a coil array free space in the description, is situated in the center of coil array 1.

The free space 6 is used for the arrangement of the 6D measuring head 8 which in turn is arranged on and attached to the stator plate 9.

FIG. 1 further allows the recognizing of the rotor 3 with the magnet array 2. The object carrier 4 and 6D area scale 7 are furthermore illustrated.

FIG. 3a shows the magnet array 2 belonging to the coil array 1. In the embodiment as per FIG. 3a, the magnet array 2 is formed by three rows of alternately polarized magnets along with a magnet bridge 11. When the rotor 3 is in the center position, the magnet bridges 11 are in each case arranged centered to the coil pairs of coil array 1.

FIG. 3b shows an embodiment of a magnet array 2 in the form of a Halbach array 14 composed of alternately polarized magnets with a rotating magnetizing vector (indicated by arrow representations).

The Halbach arrays 14 are each arranged centered to the coil pairs of coil array 1 when the rotor 3 is in the center position.

Figure 4:
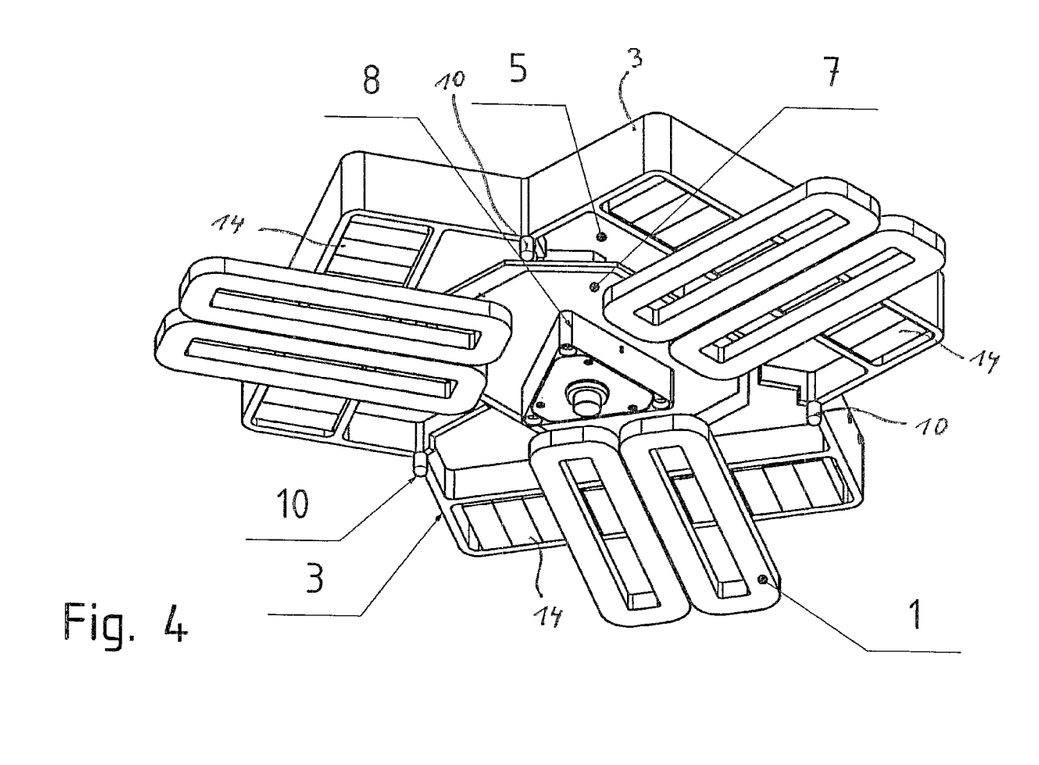
FIG. 4 a perspective view of the arrangement from below with the stator body or stator plate being omitted.
Figure 5:
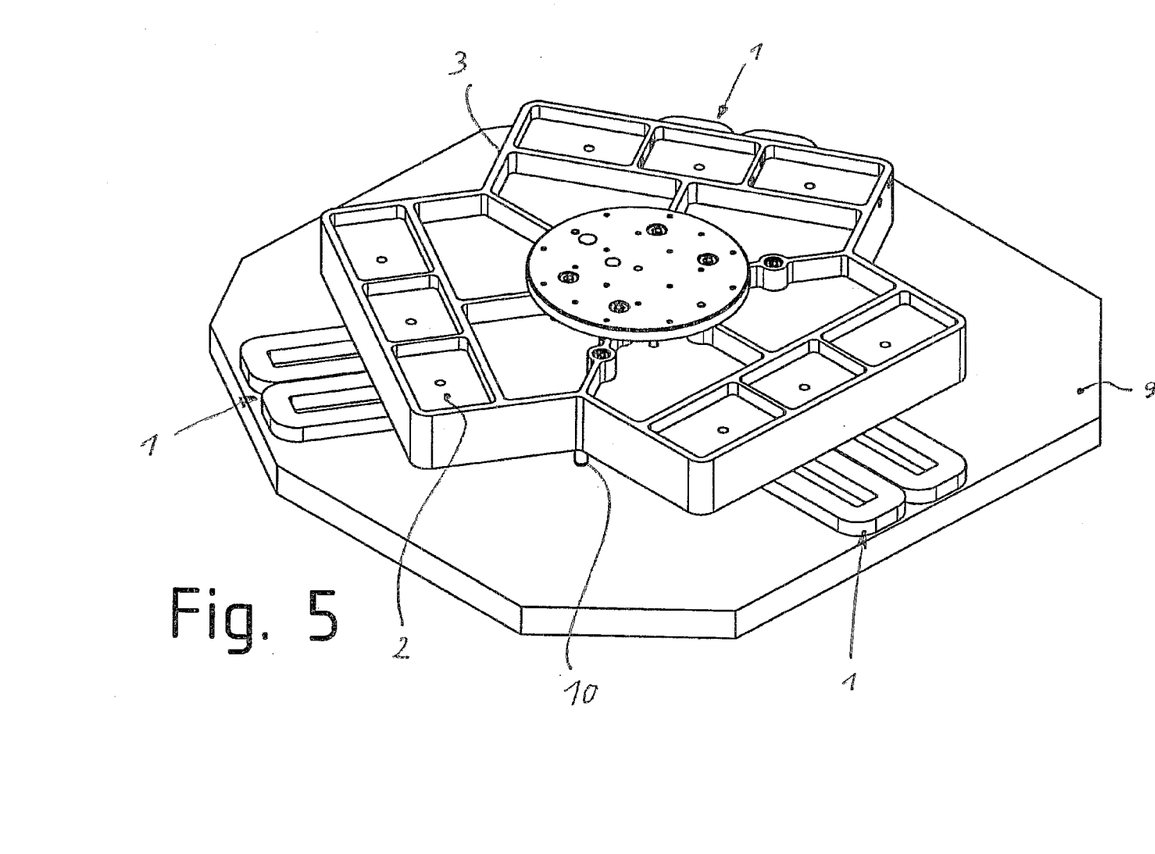
FIG. 5 a perspective view of the rotor and identifiable stator plates along with a coil array from above.

FIGS. 4 and 5 each show three magnet rows in a perspective representation which assume the shape of a triangle. The free space 5 is situated in the center of the arrangement which is utilized according to the invention for the arrangement of the 6D area scale. The previously mentioned slide feet are designated by reference numeral 10. The view from below as per FIG. 4, with stator 9 being omitted, represents a magnet array comprising three Halbach arrays 14. It should be made clear at this point that reference numeral 1, e.g. as per FIG. 2, 4 or 5, does not identify a single coil pair, rather the arrangement of three coil pairs each comprising single coils 12 and 13 constituting the coil array should be understood.

Figure 6:
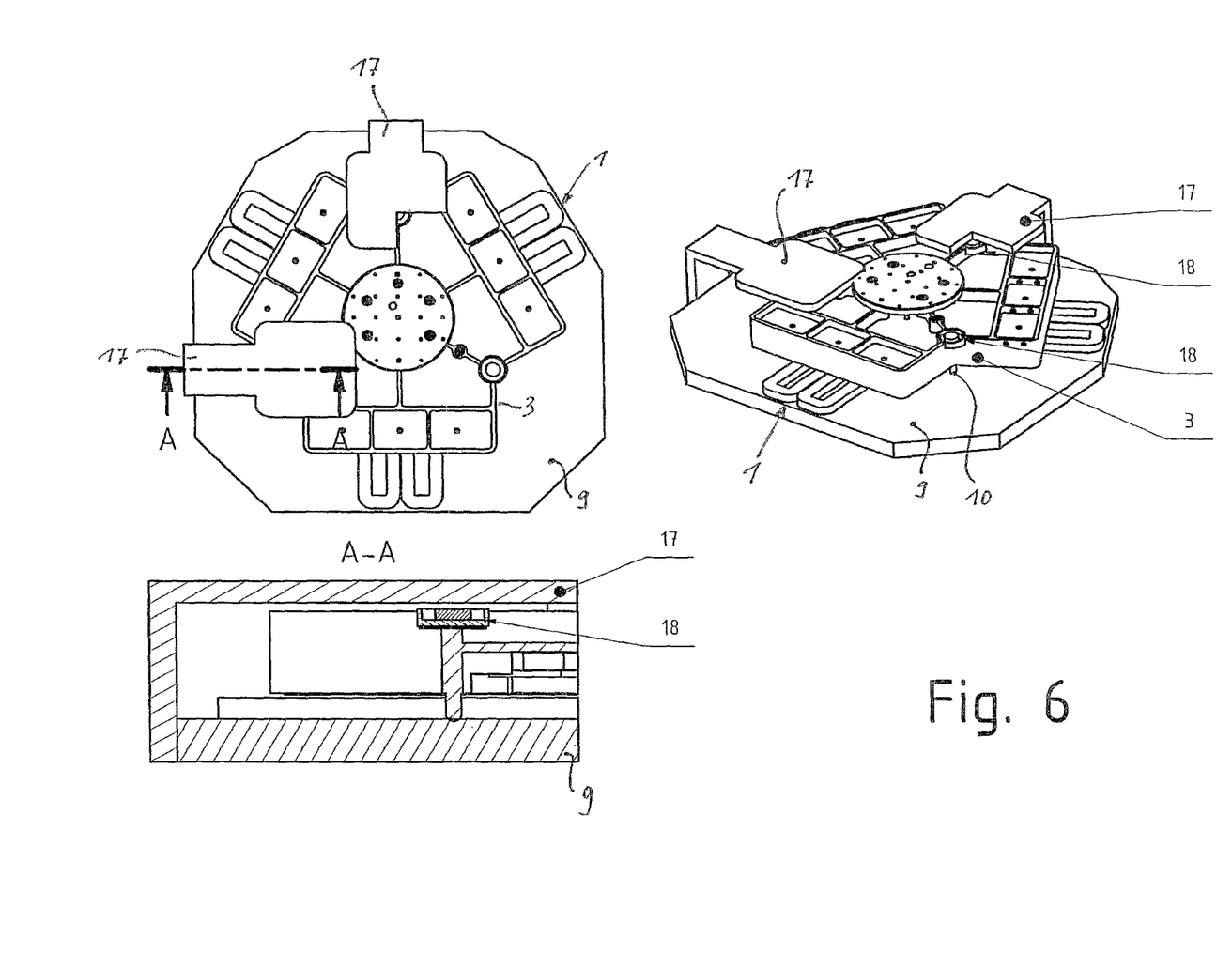
FIG. 6 a top view and perspective view of the positioning device including an arrangement for weight compensation of the rotor as well as a partial section taken along line A-A of the top view.

FIG. 6 shows a first embodiment of an arrangement for the weight compensation of rotor 3 with ferromagnetic plates 17 attached to the stator 9 covering the rotor and travel range, and permanent magnetically-excited magnet circuits 18 situated on the rotor 3.

Figure 7:
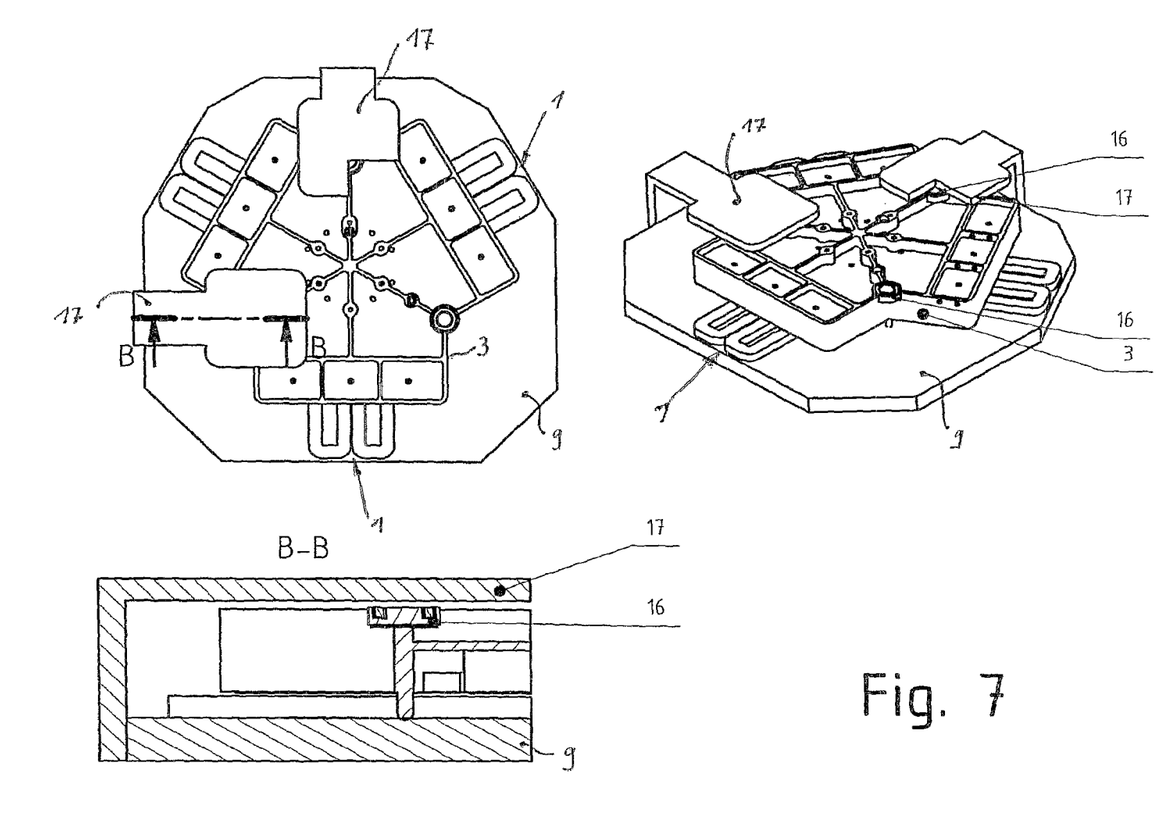
FIG. 7 representations for weight compensating the rotor according to a further embodiment with ferromagnetic plates attached to the stator and covering the rotor or travel range, and electromagnets situated on the rotor in a top view, perspective view and partial section representation B-B perpendicular to line B as per the top view, and FIG. 8 a further variant of an arrangement for weight compensating the rotor with ferromagnetic plates on the rotor and electromagnets situated above and attached to the stator in a top view, perspective view and partial section representation A-A along line A-A as per the top view.

In the second embodiment for weight compensation, illustrated on the basis of FIG. 7, ferromagnetic plates 17 covering the rotor and travel range are attached to the stator, and electromagnets 16 are present on the rotor 3.

Figure 8:
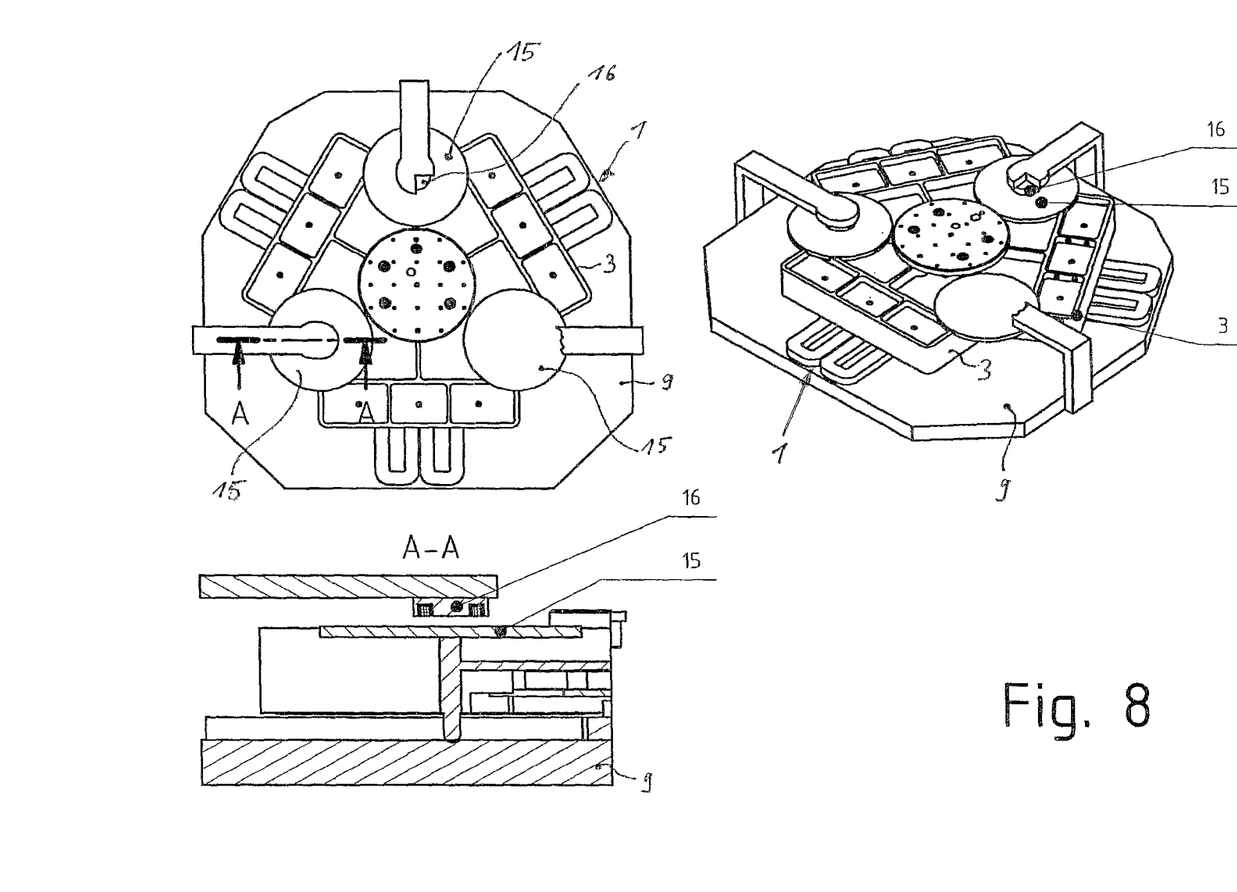

The illustrations as per FIG. 8 show the third embodiment for the weight compensation of the rotor with ferromagnetic plates 15 on the rotor and electromagnets 16 situated above and attached to the stator.

With a corresponding energization and commutation of the coil pair, horizontal and vertical forces as well as torques can be in each case imposed on the rotor 3 due to the magnetic interaction in the associated row of magnet array 2.

The force vectors are shown in FIGS. 3a and 3b as arrows above the magnet bridges and the Halbach arrays respectively.

The vertical components of the forces serve the purpose of carrying the rotor weight and of vertical positioning. The horizontal force components enable the horizontal accelerating and positioning.

When the control is taken out of service, the rotor 3 is placed to rest on the slide feet 10. When the control is put into service, the slide feet 10 serve to allow the rotor 3 to slide on the stator, in particular while scanning given reference marks on the 6D measuring system.

For the carrying and defined highly precise 6D positioning of the rotor in space, six actuator elements are realized as shown in FIGS. 2, 4 and 5, which are aggregated as a combination of coil array 1 and magnet array 2. The proposed positioning device having a six-dimensional drive can be used for the most diverse industrial and scientific purposes, yet also for inspection systems. The fact that the rotor is not impeded in its movement e.g. by power supply lines or similar, excludes interfering force influences. The rotor itself is freely accessible, which also applies to the object carrier situated on the rotor.

In a technically practiced positioning device, the movement range of the rotor is horizontally at about 100 mm, and the deflection in the z direction is about 100 μm at a positioning accuracy of about 5 nm.

$Sm_2Co_{17}$ magnets having a magnetizing level of about 28 are specifically used for the Halbach array. The single segments have been bonded. The overall arrangement is UV-compatible. The measuring head comprises in a realized solution 3D optical incremental sensors having a resolution of 5 nm in the x-y as well as torsional direction w. The capacitive sensors used to detect angular movements u and v as well as deflection in the vertical, i.e. z direction, are realized in pairs and enable resolutions of as low as one nanometer.

The invention claimed is:

1. A high-resolution positioning device having a stator and a rotor, a coil array, arranged on the stator, having at least three groups of flat coils, wherein each group has at least two single coils as a coil pair and the coil array encloses a free space on the stator, furthermore having permanent magnetically-excited circuits that are situated on, against or in the rotor and form a magnet array which likewise encloses a free space, wherein the free spaces accommodate a position measuring system which has a measuring head with sensors and an area scale, characterized in that the positioning device is formed as a freely suspended, magnetically controlled six-dimensional drive, wherein with a corresponding energization and commutation of one coil pair of the coil array, horizontal and vertical forces as well as torques can each be imposed on the rotor by the magnetic interaction in the associated row of the magnet array, and the vertical forces serve the purpose of carrying the rotor weight and the positioning of the rotor, and the permanent-magnetically excited circuits are each composed of a Halbach array comprising a plurality of segments, and the measuring head is situated in the coil array free space and the area scale in the magnet array free space, and the rotor is free of drive-related electrical or electronic and, in this regard, live parts, and for weight compensating the rotor, ferromagnetic plates covering the rotor and travel range are coupled to the stator, and permanent magnetically-excited magnet circuits to the rotor, and an air gap distance is present between the ferromagnetic plates and the permanent magnetically-excited magnet circuits, wherein the ferromagnetic plates cover the pole faces of the permanent magnetically-excited magnet circuits preferably completely in each position of the rotor.

2. The positioning device according to claim 1, characterized in that the measuring head has an area shape adapted to the coil array free space and utilizing the available space.

3. The positioning device according to claim 1, characterized in that the measuring head comprises optical incremental sensors as well as capacitive sensors.

4. The positioning device according to claim 3, characterized in that the capacitive sensors are arranged in the area edge region and at least one optical sensor is arranged in the center of the measuring head.

5. The positioning device according to claim 3, characterized in that the capacitive sensors are each composed of a pair of sensors which detect the respective distance from the surface of the area scale in order to detect angular positions and movements in the z direction therefrom.

6. The positioning device according to claim 3, characterized in that the optical sensors, in conjunction with the area scale, detect movements in the x and y directions and rotational or yaw movements about the z direction.

7. The positioning device according to claim 1, characterized in that the measuring head has the shape of a triangle and the coil array comprises three coil pairs which are arranged in a triangular shape and preferably offset from each other in each case by 120°, and the magnet array comprises three magnet rows wherein the rows of magnets are each situated centered to a coil pair when the rotor is in the center position relative the stator.

8. The positioning device according to claim 1, characterized in that the respective coil group is realized as a structural unit having cooling tubes and forming a sandwich arrangement and the respective coil group comprises an enclosure with means for supplying or discharging a cooling medium.

9. The positioning device according to claim 1, characterized in that the rotor is configured as a supporting body having hollow spaces for receiving the magnet array.

10. The positioning device according to claim 1, characterized in that reference sensors are provided for a defined start or rest position for the rotor relative to the stator.

11. The positioning device according to claim 1, characterized in that the coil array is embedded in the stator and is essentially flush with the stator surface.

12. A high-resolution positioning device having a stator and a rotor, a coil array, arranged on the stator, having at least three groups of flat coils, wherein each group has at least two single coils as a coil pair and the coil array encloses a free space on the stator, furthermore having permanent magnetically-excited circuits that are situated on, against or in the rotor and form a magnet array which likewise encloses a free space, wherein the free spaces accommodate a position measuring system which has a measuring head with sensors and an area scale, characterized in that the positioning device is formed as a freely suspended, magnetically controlled six-dimensional drive, wherein with a corresponding energization and commutation of one coil pair of the coil array, horizontal and vertical forces as well as torques can each be imposed on the rotor by the magnetic interaction in the associated row of the magnet array, and the vertical forces serve the purpose of carrying the rotor weight and the positioning of the rotor, and the permanent-magnetically excited circuits are each composed of a Halbach array comprising a plurality of segments, and the measuring head is situated in the coil array free space and the area scale in the magnet array free space, and the rotor is free of drive-related electrical or electronic and, in this regard, live parts, and for weight compensating the rotor, ferromagnetic plates covering the rotor and travel range are coupled to the stator and electromagnets interacting with the ferromagnetic plates are provided to be coupled to the rotor, wherein an air gap distance is present between the ferromagnetic plates and the electromagnets, and the ferromagnetic plates cover the pole faces of the electromagnets preferably completely in each position of the rotor.

13. The positioning device according to claim 12, characterized in that
the measuring head has an area shape adapted to the coil array free space and utilizing the available space.

14. The positioning device according to claim 12, characterized in that
the measuring head comprises optical incremental sensors as well as capacitive sensors.

15. The positioning device according to claim 14, characterized in that
the capacitive sensors are arranged in the area edge region and at least one optical sensor is arranged in the center of the measuring head.

16. The positioning device according to claim 14, characterized in that
the capacitive sensors are each composed of a pair of sensors which detect the respective distance from the surface of the area scale in order to detect angular positions and movements in the z direction therefrom.

17. The positioning device according to claim 14, characterized in that
the optical sensors, in conjunction with the area scale, detect movements in the x and y directions and rotational or yaw movements about the z direction.

18. The positioning device according to claim 12, characterized in that
the measuring head has the shape of a triangle and
the coil array comprises three coil pairs which are arranged in a triangular shape and preferably offset from each other in each case by 120°, and the magnet array comprises three magnet rows, wherein the rows of magnets are each situated centered to a coil pair when the rotor is in the center position relative the stator.

19. The positioning device according to claim 12, characterized in that
the respective coil group is realized as a structural unit having cooling tubes and forming a sandwich arrangement and
the respective coil group comprises an enclosure with means for supplying or discharging a cooling medium.

20. The positioning device according to claim 12, characterized in that
the rotor is configured as a supporting body having hollow spaces for receiving the magnet array.

21. The positioning device according to claim 12, characterized in that
reference sensors are provided for a defined start or rest position for the rotor relative to the stator.

22. The positioning device according to claim 12, characterized in that
the coil array is embedded in the stator and is essentially flush with the stator surface.

\* \* \* \* \*